(12) United States Patent
Mellot

(10) Patent No.: US 11,029,200 B2
(45) Date of Patent: *Jun. 8, 2021

(54) AMBIENT LUMINOSITY LEVEL DETECTION

(71) Applicant: STMicroelectronics (Grenoble 2) SAS, Grenoble (FR)

(72) Inventor: Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 608 days.

This patent is subject to a terminal disclaimer.

(21) Appl. No.: 15/890,533

(22) Filed: Feb. 7, 2018

(65) Prior Publication Data

US 2018/0164155 A1 Jun. 14, 2018

Related U.S. Application Data

(60) Division of application No. 14/727,918, filed on Jun. 2, 2015, now Pat. No. 9,927,291, which is a continuation of application No. 14/050,620, filed on Oct. 10, 2013, now Pat. No. 9,074,939.

(30) Foreign Application Priority Data

Oct. 25, 2012 (FR) ...................... 1260168

(51) Int. Cl.
*G01J 1/42* (2006.01)
*G01J 1/18* (2006.01)
*G01J 1/44* (2006.01)
*H04N 1/00* (2006.01)

(52) U.S. Cl.
CPC ............... *G01J 1/4204* (2013.01); *G01J 1/18* (2013.01); *G01J 1/42* (2013.01); *G01J 1/44* (2013.01); *G01J 2001/4426* (2013.01); *H04N 1/00917* (2013.01)

(58) Field of Classification Search
CPC .... G01J 1/4204; G01J 1/18; G01J 1/42; G01J 1/44; G01J 2001/4426; H04N 1/00917
See application file for complete search history.

(56) References Cited

U.S. PATENT DOCUMENTS 5,565,915 A 10/1996 Kindo et al.
6,330,030 B1 12/2001 O'Connor
(Continued)

FOREIGN PATENT DOCUMENTS

EP 2234179 A1 9/2010
WO WO-2008060670 A2 5/2008

OTHER PUBLICATIONS

INPI Search Report and Written Opinion for FR 1260168 dated Feb. 14, 2013.

*Primary Examiner* — Jennifer D Bennett
(74) *Attorney, Agent, or Firm* — Crowe & Dunlevy

(57) ABSTRACT

The following steps are performed in connection with a photodiode circuit: a) resetting the photodiode circuit; b) determining when a photodiode voltage changes in response to illumination to reach a threshold; and c) updating a counter in response to the determination in step b). The steps a) to c) are repeated until an end of a measurement period is reached. The value of the counter at the end of the measurement period is then output to indicate an intensity of the illumination.

18 Claims, 1 Drawing Sheet

(56) References Cited

U.S. PATENT DOCUMENTS

| | | | |
|---|---|---|---|
| 8,729,448 B1* | 5/2014 | Wood | H04N 5/37455 |
| | | | 250/208.1 |
| 9,074,939 B2* | 7/2015 | Mellot | G01J 1/4204 |
| 9,927,291 B2* | 3/2018 | Mellot | G01J 1/44 |
| 2003/0001080 A1 | 1/2003 | Kummaraguntla et al. | |
| 2006/0027730 A1* | 2/2006 | Bamji | G01S 7/4863 |
| | | | 250/208.1 |
| 2006/0108511 A1* | 5/2006 | Cok | G01J 1/46 |
| | | | 250/214 R |
| 2007/0252791 A1 | 11/2007 | Oomori | |
| 2009/0002520 A1* | 1/2009 | Yoshida | H04N 5/2357 |
| | | | 348/226.1 |
| 2009/0109427 A1 | 4/2009 | Yee et al. | |

* cited by examiner

AMBIENT LUMINOSITY LEVEL DETECTION

CROSS REFERENCE TO RELATED APPLICATIONS

This application is a divisional of U.S. application for patent Ser. No. 14/727,918 filed Jun. 2, 2015, which is a continuation of U.S. application for patent Ser. No. 14/050,620 filed Oct. 10, 2013 (now U.S. Pat. No. 9,074,939), which claims the priority benefit of French patent application serial number 1260168, filed on Oct. 25, 2012, the disclosures of which are hereby incorporated by reference to the maximum extent allowable by law.

TECHNICAL FIELD

The present disclosure generally relates to electronic methods and circuits, and more specifically aims at a method and a circuit for detecting the luminosity level.

BACKGROUND

Detectors of a luminosity or illumination level are known, which comprise a photodiode used in reverse mode, having its junction capacitance discharged by a photocurrent according to a received light intensity.

SUMMARY

An embodiment provides a method wherein the updating of a counter is triggered when a photodiode reaches a discharge threshold.

According to an embodiment, the photodiode is reset when it reaches said discharge threshold.

According to an embodiment, a light intensity received by the photodiode is deduced from the state of the counter at the end of a time interval.

According to an embodiment, a discharge time of the photodiode is measured after its resetting.

According to an embodiment, the time interval is such that the sum of the discharge times measured during the interval is equal to a reference period.

According to an embodiment, the reference period is selected according to the frequency of A.C. signal provided by an electric power supply network.

According to an embodiment, the reference period is a multiple of 50 ms.

According to an embodiment, a charge level of the photodiode at the end of said time interval is measured.

Another embodiment provides the use of the above-mentioned method to detect the ambient luminosity level close to the photodiode.

Another embodiment provides a circuit comprising a photodiode, a counter, and a control circuit configured to trigger an update of the counter when the photodiode reaches a discharge threshold.

According to an embodiment, the control circuit is further configured to reset the photodiode when it reaches the discharge threshold.

According to an embodiment, the control circuit is further configured to deduce a light intensity received by the photodiode from the state of the counter at the end of a time interval.

BRIEF DESCRIPTION OF THE DRAWINGS

The foregoing and other features and advantages will be discussed in detail in the following non-limiting description of specific embodiments in connection with the accompanying drawings, wherein.

For clarity, the same elements have been designated with the same reference numerals in the different drawings and, further, the timing diagram of FIG. 2 is not to scale.

DETAILED DESCRIPTION

Figure 1:
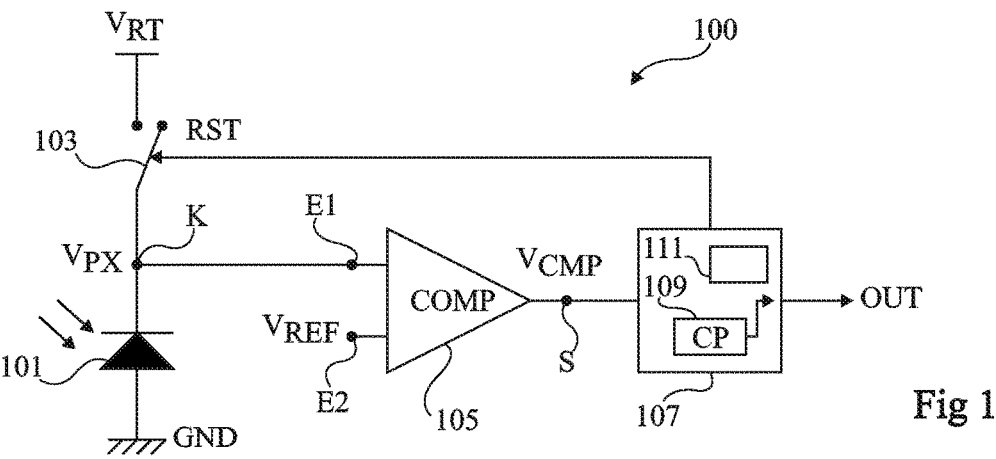
FIG. 1 is a simplified electric diagram of an embodiment of a luminosity level detector.

Luminosity level detectors may be used in combination with illuminated display screens in devices such as telephones, tablets, computers, photographic cameras, etc. to automatically adjust the screen backlighting power according to the ambient luminosity, and thus achieve power savings and/or improve the user-friendliness.

A luminosity level can be deduced from the measurement of the voltage across the photodiode, at the end of an integration period before and after the detector is reset by recharging of its photodiode. The voltage decrease across the photodiode during the integration depends on the amount of light received by the photodiode.

A problem is that, if the integration period is too long, in case of a strong luminosity, the photocurrent may be such that the photodiode reaches, before the end of the integration period, a so-called saturation discharge threshold, beyond which luminosity differences can no longer be discriminated. However, if the integration period is too short, in case of a low luminosity, the photodiode discharge during the integration period may not be sufficient to enable to discriminate luminosity differences. In practice, it is thus provided to adjust the integration period according to the order of magnitude of the luminosity level to be measured. To achieve this, it is generally provided to repeat several times the measurement by starting from a short integration period, and by progressively increasing this period until a useable measurement is obtained. The time necessary to obtain a useable measurement may be relatively long. Further, this time is dependent from the luminosity level to be measured, which may pose certain problems.

Another problem is that possible linearity defects in the photodiode response may cause inaccuracies in the measurement provided by the detector.

Another problem is that a luminosity level detector is often sensitive to the flickering of artificial light sources, supplied in A.C. mode, for example, by the mains voltage. Such a flickering may significantly disturb the measurements performed by the detector. To solve this problem, it may be provided to select an integration sub-period of the photodiode which is a multiple of the half-period of the A.C. power supply voltage, for example, a multiple of 10 ms for a 50-Hz power supply source, or a multiple of 8.33 ms for a 60-Hz power supply source. This indeed enables to ascertain that the duration when the light source is off during the integration period of the photodiode is independent from the phase-shift between the integration period of the photodiode and the A.C. power supply of the light source. However, this necessitates that the photodiode integration period may not be shorter than the half-period of the A.C. power supply source. Now, in case of a strong luminosity, the detector may saturate before the end of a half-period of the A.C. power supply voltage. The discrimination of the higher luminosity levels is then impossible.

An embodiment solves all or part of these problems.

FIG. 1 is a simplified schematic diagram of an embodiment of a luminosity level detector 100. Detector 100 comprises a photodiode 101 having its anode connected to a low power supply rail GND, for example, the ground, and having its cathode K connected, via a reset switch 103, for example, a MOS transistor, to a high power supply rail $V_{RT}$. In this example, cathode K of diode 101 is further connected to an input E1 of a comparator 105. Comparator 105 further comprises an input E2, and an output S. In this example, the operation of comparator 105 is such that voltage $V_{CMP}$ on its output S is at a first level when the voltage between inputs E1 and E2 is positive, and at a second level, for example, higher than the first level, when the voltage between inputs E1 and E2 is negative. In this example, detector 100 further comprises a control circuit 107, receiving output signal $V_{CMP}$ of comparator 105, and providing a signal RST for controlling reset switch 103. Circuit 107 further comprises an output OUT configured to provide a value representative of a luminosity level measured by the detector.

Figure 2:
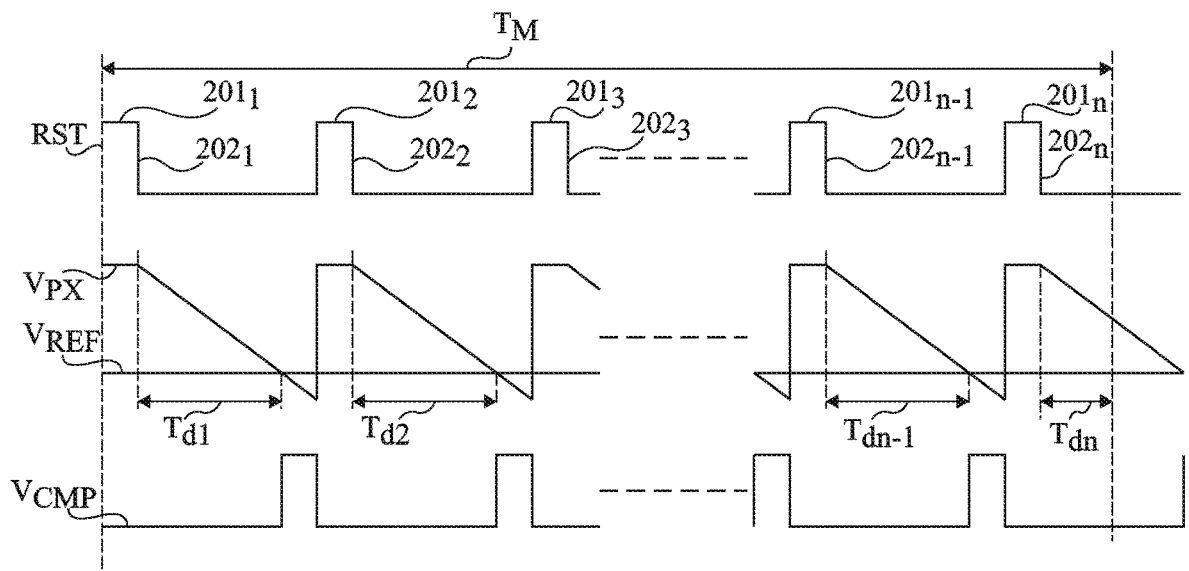
FIG. 2 is a timing diagram illustrating the operation of the detector of FIG. 1.

FIG. 2 is a timing diagram illustrating the operation of detector 100 of FIG. 1. FIG. 2 shows the variation of signal RST for controlling reset switch 103, of voltage $V_{PX}$ on cathode K of photodiode 101, of voltage $V_{REF}$ on input E2 of comparator 105, and of voltage $V_{CMP}$ on output S of comparator 105.

In this example, when signal RST is in a high state, the switch is turned on, which causes the charging of photodiode 101. Voltage $V_{PX}$ on cathode K of photodiode 101 is then substantially equal to high power supply voltage $V_{RT}$ (to within the voltage drop of switch 103). However, when signal RST is in a low state, switch 103 is off and photodiode 101 is disconnected from rail $V_{RT}$. The photodiode is then sensitive to light, and voltage $V_{PX}$ of its cathode decreases at a rate which depends on the light intensity received by the photodiode.

According to an aspect, detector 100 is configured so that, within a luminosity level measurement time interval $T_M$, each time photodiode 101 reaches a discharge threshold, a counter 109 (CP), for example, comprised within control circuit 107, is updated, that is, incremented or decremented. Detector 100 is further configured so that, in measurement interval $T_M$, each time photodiode 101 reaches the discharge threshold triggering the update of counter 109, the photodiode is reset.

In the illustrated example, measurement interval $T_M$ starts with a resetting of photodiode 101. To achieve this, control circuit 107 applies to signal RST a pulse $201_1$ for controlling the turning-on of transistor 103. During pulse $201_1$, cathode voltage $V_{PX}$ of diode 101 is substantially equal to high power supply voltage $V_{RT}$.

Falling edge $202_1$ of pulse $201_1$ marks the beginning of an integration period of the photodiode, during which voltage $V_{PX}$ decreases at a rate depending on the light intensity received by the photodiode. During this integration period, a constant voltage $V_{REF}$, lower than voltage $V_{RT}$, is applied to input node E2 of comparator 105. Voltage $V_{REF}$ is for example slightly greater than the saturation threshold of photodiode 101.

During the reset phase (pulse $201_1$) and at the beginning of the integration period, voltage $V_{PX}$ being higher than voltage $V_{REF}$, output voltage $V_{CMP}$ of comparator 105 is in the low state.

After a discharge time $T_{d1}$ which depends on the light intensity received by the photodiode, and which is thus not known before the beginning of the integration period, voltage $V_{PX}$ reaches voltage $V_{REF}$, and comparator 105 switches state. Control circuit 107 is configured to detect such a state switching (that is, a rising edge of signal $V_{CMP}$ in this example) and, as a response, to update counter 109 and reset the photodiode by applying to signal RST a pulse $201_2$ for controlling the turning-on of switch 103.

A new integration period of the photodiode then starts, and the above-mentioned sequence (discharge of the photodiode down to threshold $V_{REF}$, detection of a state switching of the comparator, counter update, and resetting of the photodiode) is repeated, and so on until the end of measurement interval $T_M$.

Thus, during measurement interval TM, detector 100 carries out n (n being an integer greater than or equal to 1) discharge cycles of photodiode 101, each cycle comprising a photodiode reset step, followed by an integration period. Each cycle ends after the photodiode has reached the discharge threshold set by voltage $V_{REF}$, except for the last cycle which may end before voltage $V_{PX}$ reaches threshold $V_{REF}$. Counter 109 is updated at the end of each full discharge cycle. The number of cycles carried out within an interval $T_M$ depends on the light intensity received by the photodiode, and is thus not known before the beginning of interval $T_M$. The higher the light intensity received by the photodiode, the greater the photodiode discharge speed, and the higher the number of cycles performed within interval $T_M$. Conversely, the lower the light intensity received by the photodiode, the lower the photodiode discharge speed, and the smaller the number of cycles performed within interval $T_M$. Below a given luminosity threshold, the photodiode never reaches the discharge threshold set by voltage $V_{REF}$ during interval $T_M$. In this case, interval $T_M$ only contains a partial discharge cycle.

Thus, the number of updates of counter 109 during interval $T_M$ is representative of the luminosity level received by the photodiode during interval $T_M$. At the end of measurement interval $T_M$, a luminosity level received by the photodiode during interval $T_M$ may be deduced from the state of counter 109.

As an example, counter 109 may be reset at the beginning of interval $T_M$, and the state of counter 109 at the end of interval $T_M$ may be directly used as a measurement of the luminosity level, and transferred onto output OUT of the detector. In this case, an advantage is that detector 100 does not require providing an analog-to-digital converter to sample a discharge level of its photodiode. This enables to decrease the bulk, the cost, and the power consumption of the detector.

As a variation, to make the measurement more accurate still, detector 100 may comprise an analog-to-digital converter (not shown) and may be configured so as to, at the end of the last discharge cycle of photodiode 101, which may be a partial discharge cycle, sample the discharge level of photodiode 101. An output value OUT representative of the luminosity level received by the photodiode can then be determined by taking into account not only the number of updates of counter 109 during interval $T_M$, but also the level reached by the photodiode at the end of the last discharge cycle.

The duration of interval $T_M$ may be set before the beginning of the measurement. In this case, the total effective discharge time of the photodiode during interval $T_M$ depends on the luminosity received by the photodiode. Indeed, the higher the luminosity, the larger the number of discharges cycles during interval $T_M$, and the larger the portion of interval $T_M$ used to reset the photodiode and update counter 109. Conversely, the lower the luminosity, the lower the number of discharges cycles during interval $T_M$, and the smaller the portion of interval $T_M$ used to reset the photodiode and update counter 109. It should indeed be noted that the duration of the photodiode reset and counter update phases between discharge cycles is independent from the luminosity level received by the detector. Thus, for a given measurement interval $T_M$, the higher the luminosity, the shorter the total effective photodiode discharge time during interval $T_M$, and conversely.

In an embodiment, only total effective photodiode discharge time $T_D$ during interval $T_M$ is set before the beginning of the measurement, and interval $T_M$ varies according to the luminosity received by the photodiode. For this purpose, in each photodiode discharge time during measurement interval $T_M$, effective discharge time $T_{di}$ (i being an integer ranging from 1 to n) of the photodiode, between falling edge $202_i$ of reset pulse $201_i$ and the time of the cycle when the photodiode reaches the discharge threshold set by voltage $V_{REF}$, is measured, for example, by means of a time measurement circuit 111 which may be part of control circuit 107. Circuit 111 for example comprises a clock (not shown) and a counter (not shown) capable of being triggered by the rising and/or falling edges of the clock. The end of interval $T_M$ coincides with the time when the addition of discharge times $T_{di}$ measured from the beginning of interval $T_M$ reaches a reference threshold duration $T_D$ set before the beginning of the measurement. For a given effective discharge time $T_D$, measurement interval $T_M$ will be all the longer as the luminosity is high, and conversely.

Total discharge time $T_D$ of the photodiode preferably is a multiple of the half-period of the mains A.C. power supply voltage. This enables to make the detector insensitive to the flickering of artificial light sources powered by the mains. Preferably, time $T_D$ is a multiple of 50 ms. Indeed, most A.C. electric power supply distribution networks operate either at 50 Hz or at 60 Hz, and 50 ms is a multiple both of the half-period of a 50-Hz A.C. signal (10 ms) and of the half-period of a 60-Hz A.C. signal (8.33 ms). The selection of a time $T_D$ which is a multiple of 50 ms thus enables to make the detector insensitive to flickering, whatever the location where the detector is used.

An advantage of the embodiment described in relation with FIGS. 1 and 2 is that it is not necessary to repeat the measurement several times to adjust an integration period of the photodiode according to the ambient luminosity level to obtain a useable measurement. Indeed, in the embodiment of FIGS. 1 and 2, measurement interval $T_M$, or the effective total discharge time $T_D$ of the photodiode, may be selected to be sufficiently long to be compatible both with the lowest luminosity levels and with the highest luminosity levels. It should indeed be noted that, in the embodiment of FIGS. 1 and 2, the selection of a long measurement time $T_M$ or total discharge time $T_D$ is not incompatible with the discrimination of high luminosity levels. Generally, it should be noted that in the embodiments of FIGS. 1 and 2, whatever the luminosity level to be measured, the longer the measurement time $T_M$ or total discharge time $T_D$ of the photodiode, the higher the accuracy of the measurement provided by the detector.

Another advantage of the embodiment of FIGS. 1 and 2 is that total effective discharge time $T_D$ of the photodiode may be selected to be sufficiently long to provide a measurement independent from the flickering of artificial light sources power in A.C. mode, without for the discrimination of the highest luminosity levels to be adversely affected by this.

Another advantage of the embodiment of FIGS. 1 and 2 is that the measurement of the luminosity level provided by the detector is not, or is only slightly, affected by possible linearity defects of photodiode 101. This especially results from the fact that diode 101 operates in full discharge cycles always ending at a same level, set by voltage $V_{REF}$, and that the indication of the luminosity level does not depend, for the most part, on a measurement of a discharge level of the photodiode at the end of an integration period.

Another advantage is that the signal-to-noise ratio of the measurements provided by detector 100 is higher than that of the measurements provided by a detector where the indication of the luminosity level essentially results from a measurement of the discharge level of the photodiode after an integration period.

Figure 3:
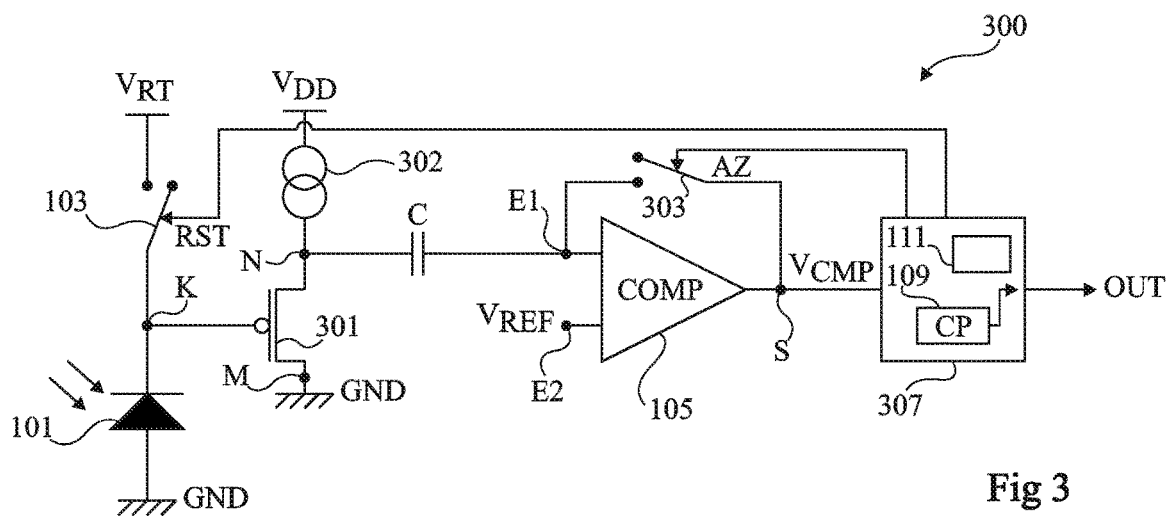
FIG. 3 is a simplified electric diagram of an alternative embodiment of a luminosity level detector.

FIG. 3 is a simplified electric diagram of an alternative embodiment of the luminosity level detector of FIG. 1. Detector 300 of FIG. 3 comprises a photodiode 101 having its anode connected to a low power supply rail GND, for example, the ground, and having its cathode K connected, via a reset switch 103, for example, a MOS transistor, to a high power supply node or rail $V_{RT}$. In this example, cathode K of diode 101 is further connected to the gate of a MOS transistor 301 assembled as a voltage follower, having its conduction nodes N and M respectively connected to a high power supply rail $V_{DD}$, via a current source 302, and to low power supply rail GND. It should be noted that high voltage node $V_{RT}$ may be directly connected to high power supply rail $V_{DD}$ or may be connected to the output of a regulator providing a high-level voltage different from voltage $V_{DD}$. In this example, node N is connected to a first electrode of a capacitor C having its second electrode connected to an input E1 of a comparator 105. Comparator 105 further comprises an input E2 and an output S. As in the example of FIG. 1, in operation, voltage $V_{CMP}$ on output S of comparator 105 is at a first level when the voltage between inputs E1 and E2 is positive, and at a second level when the voltage between inputs E1 and E2 is negative. Detector 300 further comprises a switch 303 connecting input E1 to output S of the comparator. Switch 303, when it is in the on state, forms a negative feedback loop resetting the detector by forcing input E1 of comparator 105 to the voltage of input E2. In operation, the turning-on of switch 303 causes the resetting of capacitor C to a charge level set by a voltage $V_{REF}$ applied to terminal E2 of the comparator. In this example, detector 300 further comprises a control circuit 307, receiving output signal $V_{CMP}$ of comparator 105, and providing a signal RST for controlling reset switch 103 of photodiode 101, and a signal AZ for controlling switch 303 for resetting capacitor C. Circuit 107 further comprises an output OUT configured to provide a value representative of a luminosity level measured by the detector.

In operation, in a detector reset step, switches 103 and 303 are turned on, which causes the charge of photodiode 101 to a level set by voltage $V_{RT}$, and the resetting of capacitor C to a level set by voltage $V_{REF}$. In a photodiode integration or discharge phase, following a reset step, switches 103 and 303 are off. The cathode voltage of photodiode 101, substantially equal to voltage $V_{RT}$ at the beginning of the integration, is transferred onto input E1 of comparator 105 via transistor 301 and capacitor C. The voltage at node E1 then decreases at a rate depending on the luminosity level received by the photodiode, to reach level $V_{REF}$, which causes a state switching of the comparator and the updating of counter 109.

The embodiment of FIG. 3 has all the advantages of the embodiment of FIGS. 1 and 2 and is compatible with the operation described in relation with FIGS. 1 and 2.

Another advantage of the embodiment of FIG. 3 is that transistor 301 and capacitor C enable to achieve an impedance matching between photodiode 101 and comparator 105.

As a variation, a complementary circuit, not shown, may be provided to apply a first reference voltage on input E1 of the comparator during detector reset steps, and a second reference voltage lower than the first voltage during photodiode discharge phases.

Specific embodiments have been described. Various alterations, modifications, and improvements will occur to those skilled in the art. In particular, the described embodiments are not limited to the detection circuit examples of FIGS. 1 and 3. Based on the teachings of the present application, it will be within the abilities of those skilled in the art to form other circuits for detecting the luminosity level, capable of implementing the desired operation, that is, counting, during a measurement time interval, the number of discharge cycles of a photodiode, and deducing therefrom a luminosity level received by the photodiode.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method, comprising:
   a) resetting a photodiode;
   b) determining when a photodiode voltage changes in response to illumination to reach a threshold;
   c) updating a counter in response to the determination in step b);
   d) repeating steps a) to c) until an end of a measurement period is reached; and
   e) outputting a value of the counter at the end of the measurement period that is indicative of an intensity of said illumination;
   wherein a difference between a time for resetting the photodiode and a time when the threshold is reached is a discharge time; and
   wherein the measurement period expires when a sum of a plurality of consecutive discharge times equals or exceeds a threshold period.

2. The method of claim 1, wherein said measurement period is at least equal to a multiple of a half period of an A.C. mains power supply.

3. The method of claim 2, wherein the A.C. mains power supply operates at a frequency selected from a group consisting of 50 Hz and 60 Hz.

4. The method of claim 1, wherein said measurement period is selected according to a frequency of A.C. signals provided by an electric power supply network.

5. The method of claim 1, wherein said measurement period is a multiple of 50 ms.

6. The method of claim 1, further comprising measuring a charge level of the photodiode at the end of said measurement period.

7. The method of claim 6, further comprising adjusting the output value of the counter in response to the measured charge level.

8. A method, comprising:
   a) sensing a discharge of a photodiode;
   b) in response to said sensing: triggering an updating of a counter storing a count value and resetting the photodiode;
   c) measuring a discharge time of the photodiode after resetting of the photodiode;
   d) repeating steps a) to c) over a time interval; and
   e) outputting a light intensity received by the photodiode as said count value of the counter at an end of the time interval;
   wherein the time interval is equal to a sum of a plurality of discharge times for said photodiode.

9. The method of claim 8, further comprising summing the plurality of discharge times; comparing the sum to a threshold duration; and terminating the time interval when the sum equals or exceeds the threshold duration.

10. The method of claim 9, wherein the threshold duration is selected according to a frequency of A.C. signals provided by an electric power supply network.

11. The method of claim 9, wherein said threshold duration is a multiple of 50 ms.

12. The method of claim 8, further comprising measuring a charge level of the photodiode at the end of said time interval.

13. The method of claim 12, further comprising adjusting the count value in response to the measured charge level.

14. A method, comprising:
   a) generating by a photodiode of a voltage which changes at a rate dependent on illumination;
   b) comparing the voltage to a reference;
   c) incrementing a count value in response to said comparison and resetting the photodiode;
   repeating steps a) to c) until a measurement period expires; and
   outputting the count value at an end of the measurement period as being indicative of an intensity of said illumination;
   wherein a difference between a time for resetting the photodiode and a time for the compared voltage to pass the reference change is a discharge time, and wherein the measurement period expires when a sum of a plurality of consecutive discharge times equals or exceeds a threshold period.

15. The method of claim 14, wherein said measurement period is at least equal to a multiple of a half period of an A.C. mains power supply.

16. The method of claim 15, wherein the A.C. mains power supply operates at a frequency selected from the group consisting of 50 Hz and 60 Hz.

17. The method of claim 14, further comprising measuring the voltage of the photodiode at the end of said measurement period.

18. The method of claim 17, further comprising adjusting the count value in response to the measured voltage.

* * * * *